US009562697B2

(12) United States Patent
Ng et al.

(10) Patent No.: US 9,562,697 B2
(45) Date of Patent: Feb. 7, 2017

(54) CIRCULATING HOT WATER SYSTEM AND OR APPLIANCE

(71) Applicant: Rheem Australia Pty Limited, Rydalmere, NSW (AU)

(72) Inventors: Wilson Ng, NSW (AU); David Micallef, NSW (AU)

(73) Assignee: RHEEM AUSTRALIA PTY LIMITED (AU)

( * ) Notice: Subject to any disclaimer, the term of this patent is extended or adjusted under 35 U.S.C. 154(b) by 106 days.

(21) Appl. No.: 13/804,379

(22) Filed: Mar. 14, 2013

(65) Prior Publication Data

US 2013/0247997 A1    Sep. 26, 2013

(30) Foreign Application Priority Data

Mar. 22, 2012  (AU) .................................. 2012901168

(51) Int. Cl.
  *F24D 19/10* (2006.01)
  *E03C 1/044* (2006.01)
  (Continued)

(52) U.S. Cl.
  CPC .......... *F24D 19/1051* (2013.01); *E03C 1/044* (2013.01); *F24D 17/0078* (2013.01); *F24H 1/107* (2013.01); *F24H 9/128* (2013.01); *F24J 2/345* (2013.01); *F24J 2/42* (2013.01); *G05D 23/19* (2013.01); *F24D 19/1036* (2013.01); *F24D 2200/043* (2013.01); *Y10T 137/0391* (2015.04); *Y10T 137/4673* (2015.04);
  (Continued)

(58) Field of Classification Search
  CPC ........... F24J 2/345; F24J 2/42; F24D 17/0078; F24D 19/1051; F24D 2200/043; Y10T 137/85954; Y10T 137/6497; Y10T 137/4673; Y10T 137/4857; Y10T 137/87362; E03C 1/044
  USPC . 137/255, 266, 599.14, 337, 563; 122/448.3
  See application file for complete search history.

(56) References Cited

U.S. PATENT DOCUMENTS 3,840,175 A * 10/1974 Jacuzzi ....................... 236/20 R
4,936,289 A *  6/1990 Peterson ...................... 122/13.3
(Continued)

FOREIGN PATENT DOCUMENTS

GB        1169383  A    11/1969
GB        2315855  A     2/1998

*Primary Examiner* — Atif Chaudry
(74) *Attorney, Agent, or Firm* — Nielson Mullins Riley & Scarborough, LLP (57) ABSTRACT

A water heating system having a system inlet pipe (1.002), a hot water delivery pipe (1.003) and a hot water return pipe (1.006) connected to a building hot water distribution network (1.024); the water heating system including one or more water heaters (1.001), the or each water heater having a heater inlet (1.022) and a heater outlet (1.023), a hot water return pipe (1.006) connected between the system inlet and delivery outlet via the building hot water distribution network to form a close loop hot water supply-return circuit; a pump (1.005) connected to circulate water through the hot water supply-return circuit whereby the pump can circulate water through one or more of the water heaters;
a valve means (1.007) [a first non-return valve] adapted to prevent inlet water (water delivered to the system inlet) from flowing into the hot water return pipe or the building hot water distribution network.

6 Claims, 4 Drawing Sheets

(51) Int. Cl.
*F24J 2/42* (2006.01)
*F24J 2/34* (2006.01)
*F24D 17/00* (2006.01)
*F24H 1/10* (2006.01)
*F24H 9/12* (2006.01)
*G05D 23/19* (2006.01)

(52) U.S. Cl.
CPC .... *Y10T 137/4857* (2015.04); *Y10T 137/6443* (2015.04); *Y10T 137/6497* (2015.04); *Y10T 137/85954* (2015.04); *Y10T 137/85986* (2015.04); *Y10T 137/87362* (2015.04); *Y10T 137/87877* (2015.04)

(56) References Cited

U.S. PATENT DOCUMENTS

| | | | |
|---|---|---|---|
| 5,096,145 A * | 3/1992 | Phillips | B64F 5/0063 244/134 C |
| 5,261,443 A | 11/1993 | Walsh | |
| 5,368,013 A * | 11/1994 | Herweyer | 122/14.31 |
| 5,655,710 A * | 8/1997 | Kayahara et al. | 237/81 |
| 7,971,603 B2 * | 7/2011 | Willis | F28F 9/02 137/454.6 |
| 2009/0145490 A1 * | 6/2009 | Kershisnik | 137/334 |
| 2012/0063755 A1 * | 3/2012 | Lucker et al. | 392/470 |

* cited by examiner

CIRCULATING HOT WATER SYSTEM AND OR APPLIANCE

FIELD OF THE INVENTION

This invention relates to hot water systems and appliances. They will be described in the context of a circulating hot water system including one or more instantaneous water heaters.

In particular, the invention can be used in commercial buildings which have a high demand for hot water for heating or for use in bathrooms, etc.

BACKGROUND OF THE INVENTION

Figure 1:
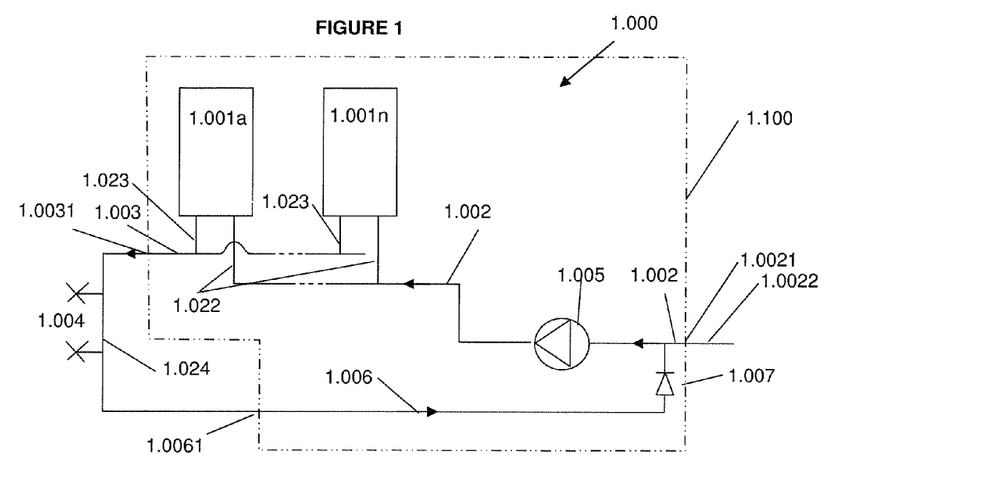
FIG. 1 is a schematic illustration of a multi-water heater circulating water heating system.

FIG. 1 shows a circulating water heating system 1.000, which is contained within an appliance 1.100 schematically represented by a dash and two dot surrounding line. The system has one or more water heaters 1.001$a$ . . . 1.001$n$, each having a heater inlet 1.022 and a heater outlet 1.023. The water heaters can be instantaneous water heaters, which heat the water only when water is drawn off by the users of the system. Each heater inlet 1.022 is connected to a system inlet pipe 1.002. The system inlet pipe 1.002 is connected to mains water supply or preheated water source 1.0022 via an appliance inlet fitting at 1.0021, and via which water to be heated is fed into the system. Each heater outlet 1.023 is connected to a hot water delivery pipe 1.003 which is connected to a hot water outlet fitting 1.0031 on the outside of the appliance 1.100. The hot water delivery pipe 1.003 is thus connected via fitting 1.0031 and a building hot water distribution network 1.024, to a number of user outlets or heat exchanger devices 1.004 via, to permit users to draw off hot water. Each water heater can have an adjustable and or controllable water control valve to control flow of water through the water heater. Each water heater can have a flow sensor which can operate the associated water heater when flow is detected.

The water heaters 1.001$a$ . . . 1.001$n$ can have a controllable gas valve and ignition means. The ignition means can be any suitable ignition means such as a pilot flame. The ignition means can be a controllable ignition means such as a spark generator.

The water heaters are connected in parallel between the system inlet pipe 1.002 and the hot water delivery pipe 1.003.

A closed loop hot water supply-return circuit forms a closed circuit with the hot water delivery pipe 1.003, the building hot water distribution network 1.024, which connects back to the appliance 1.100 via a hot water return inlet fitting at 1.0061, which in turn connects to a hot water return pipe 1.006 then system inlet pipe 1.002 and water heaters 1.001$a$ . . . 1.001$n$. A pump 1.005 is adapted to circulate water through the water heaters 1.001$a$ . . . 1.001$n$, the hot water delivery pipe 1.003, building hot water distribution network 1.024 and the hot water return pipe 1.006. The hot water return pipe 1.006 connects to the system inlet pipe 1.002 so the pump can increase the pressure at the heater inlets 1.022.

A non-return valve 1.007 inhibits reverse flow through the hot water return pipe 1.006, so cold water from main water supply cannot bypass the water heaters and reach the user outlets 1.004 via the hot water return pipe 1.006 and the building hot water distribution network 1.024.

The pump can be used to circulate water through the water heaters 1.001$a$ . . . 1.001$n$ to maintain the temperature of the water in the close loop hot water supply-return circuit above a first threshold temperature, so that, when user outlets or heat exchanger devices 1.004 are activated, such as by opening a hot water tap, the water will be at a required temperature.

A single water heater can adequately heat a first level of consumption, while two water heaters are required to meet a demand which exceeds the capacity of a single water heater, and so on. The capacity of each water heater is a known design factor.

Each water heater can have its own flow sensor although a single flow sensor can be used in the hot water delivery pipe 1.003 or in the system inlet pipe 1.002.

Each water heater can have a maximum input capacity or flow rating. The water heater is designed to heat water at a flow rate up to the maximum flow rate to a specified temperature rise. If the flow through the water heater exceeds this input capacity, the water heater cannot heat the water to the required temperature. The water heater can also be designed to have a greater the pressure drop across the water heater when the flow exceeds the maximum flow rate. As the water heaters are in parallel, then, assuming "n" water heaters of the same design, the maximum flow rate for the combination of water heaters to heat water to the required temperature will be n times the flow rate of a single water heater.

The pump can be run continuously, or run according to a timer setting, and one of the water heaters or all water heaters are maintained operational, so that the pump can circulate hot water through the hot water delivery pipe 1.003, the building hot water distribution network 1.024 and hot water return pipe 1.006, to ensure that hot water is immediately available at the user outlets 1.004, such as shower taps.

In order to avoid the delivery of water at a temperature below the specified temperature, flow control means can be used to limit the flow of water through the water heaters to a predetermined maximum flow. While this may avoid the problem of delivering water at a lower than specified temperature, it results in a drop in the pressure of the hot water delivered to the user outlets or heat exchanger devices 1.004.

The present invention proposes an arrangement to mitigate the effects of decreased hot water pressure at high flow rates.

SUMMARY OF THE INVENTION

The present invention provides a water heating system having a system inlet, a delivery outlet and hot water return inlet connected to a building hot water distribution network; the water heating system including one or more water heaters, the or each water heater having a heater inlet and a heater outlet, a supplemental path connecting the system inlet to the delivery outlet; the supplemental path including a flow control device adapted to permit flow from the system inlet to the delivery outlet when the pressure at the delivery outlet is lower than the pressure at the system inlet by a predetermined pressure differential.

The present invention also provides a water heating system having a system inlet, a delivery outlet and hot water return inlet connected to a building hot water distribution network; the water heating system including one or more water heaters, the or each water heater having a heater inlet and a heater outlet, a supplemental path connecting the system inlet to the delivery outlet; the supplemental path bridging the water heater or water heaters and including a flow control device adapted to permit flow from the system inlet to the delivery outlet when the pressure differential across the water heater or water heaters exceeds a predetermined pressure differential.

The predetermined pressure differential can correspond to a predetermined water flow rate through the water heaters.

The water heating system can include a hot water return inlet connecting the remote end of the building hot water distribution network back to the system inlet of the water heating system whereby its forms a circulation path including the water heaters.

The water heating system can include one or more water heaters, the inlet of each water heater being connected to the system inlet, and the outlet of each water heater being connected to the delivery outlet.

The water heating system can include a valve means adapted to prevent water delivered to the system inlet from flowing directly into the hot water return path and building hot water distribution network.

The building hot water distribution network can include one or more user outlets.

The water heating system can include a supplemental path connecting the system inlet to the delivery outlet, the supplemental path including a flow control device such as an electronically controlled valve or pressure activated device oriented so a pressure differential between the inlet of the pressure activated device and the outlet of the pressure activated device enables water at system inlet to be fed to the delivery outlet when the pressure at the delivery outlet is less than that of the system inlet by the operating pressure of the pressure activated device.

The water heating system can include a storage tank between the system inlet and the pressure activated device, whereby water from the storage tank is delivered to the delivery outlet when the pressure differential across the pressure activated device opens the pressure activated device.

The pump can be connected to the inlet of the storage tank, the water heating system including a recirculation pipe (3.016) and a second non-return valve (3.015) connecting the outlet of the storage tank to the system inlet.

The water heating system can include a third non-return valve connected between the system inlet and the pump outlet to prevent delivery of water from the pump to the system inlet without passing through the storage tank.

The invention also provides a method of operating a water heating system including: one or more water heaters having their heater inlets connected in parallel to a system inlet pipe and their outlets connected in parallel to a hot water delivery pipe; these water heaters connected in parallel to the system inlet pipe and the hot water delivery pipe can be in cascade or in equal differential pressure arrangement; a hot water return pipe connecting the end of the building hot water distribution pipe to the system inlet pipe; a circulating pump adapted to circulate water through the hot water delivery pipe and the building hot water distribution pipe and the hot water return pipe and the system inlet pipe and one or more selected ones of the water heaters; a supplemental flow pipe connected from the system inlet pipe to the hot water delivery pipe, the supplemental flow pipe including a pressure activated device; the method including the steps of: sensing the pressure differential across the water heaters; opening the pressure activated device when the pressure differential exceeds a predetermined value.

The present invention provides a system which can be purpose built or embodied within an appliance.

BRIEF DESCRIPTION OF THE DRAWINGS

An embodiment or embodiments of the present invention will now be described, by way of example only, with reference to the accompanying drawings, in which.

The numbering convention used in the drawings is that the digits in front of the full stop indicate the drawing number, and the digits after the full stop are the element reference numbers. Where possible, the same element reference number is used in different drawings to indicate corresponding elements.

The drawings are intended to illustrate the inventive features of the embodiments illustrated and are not necessarily to scale.

DETAILED DESCRIPTION OF THE EMBODIMENT

The invention will be described with reference to the embodiments illustrated in the accompanying drawings.

Figure 2:
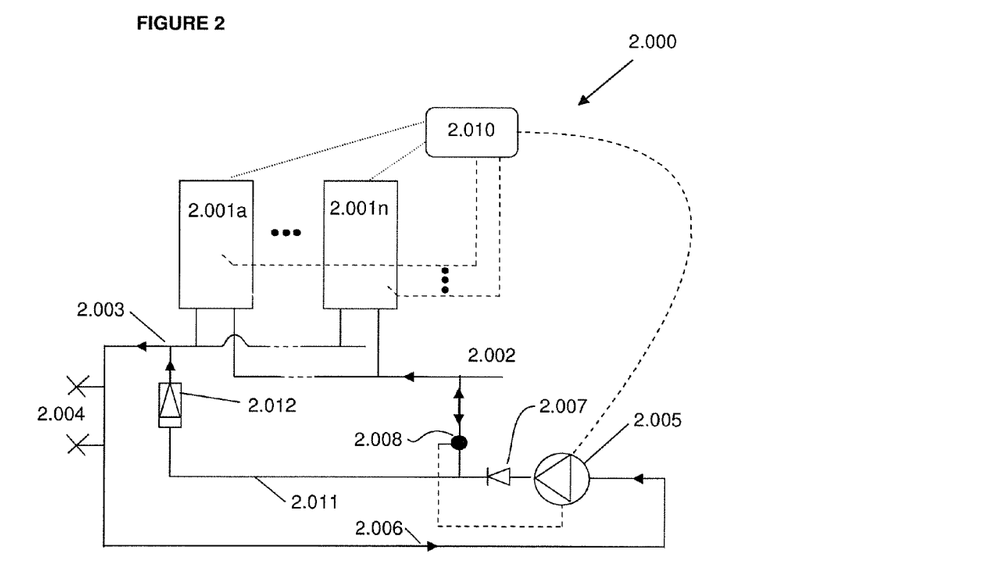
FIG. 2 is a schematic illustration of a circulating water heating system according to an embodiment of the invention.

FIG. 2 illustrates a system 2.000 according to a first embodiment of the invention. The system of FIG. 2 is similar to that of FIG. 1, but includes additional elements to mitigate at least one of the problems of existing circulating hot water systems.

The system 2.000 includes a bank of instantaneous water heaters or continuous flow water heaters 2.001$a$ to 2.001$n$ with system inlet pipe 2.002 connected to mains water supply or pre-heated water source, a hot water delivery pipe 2.003 connected to building hot water distribution network 2.024 with one or more hot water consumption outlets 2.004, a hot water return pipe 2.006 connected to the remote end of the building hot water distribution network 2.024 to form a close circuit, pump 2.005, non-return valve 2.007, temperature sensor 2.008, a supplemental flow pipe 2.011 with a pressure activated device 2.012 forming a supplemental path between the system inlet pipe 2.002 and the hot water delivery pipe 2.003. The pump outlet also connects with the system inlet pipe 2.002 via non-return valve 2.007. A controller 2.010 can also be included. The controller 2.010 can be responsive to sensors such as temperature sensors, including temperature sensor 2.008, or pressure sensors, or both, to control one or more of the devices of the water heating system. The controller 2.010 can control the pump. The controller 2.010 can control the water flow in the water heaters. The controller 2.010 can control the heating operation of the water heaters. However, the water heaters may alternatively be automatically responsive to the flow of water to heat the water.

The pressure activated device 2.012 is included in the supplemental flow pipe 2.011. The pressure activated device 2.012 permits flow from its inlet to its outlet when the pressure at the outlet of the pressure activated device 2.012 is less than the pressure at the inlet of the pressure activated device by ΔP, where ΔP is the operating pressure differential of the pressure activated device. Flow in the opposite direction is always blocked by pressure activated device 2.012.

The supplemental flow pipe 2.011 is connected between the system inlet pipe 2.002 and the hot water delivery pipe 2.003 and provides a supplemental path when the water pressure at the inlet side of pressure activated device 2.012 exceeds the pressure in the hot water delivery pipe 2.003 adjacent the outlet of the pressure activated device 2.012 by an amount determined by the operating characteristics of valve 2.012, ie, when the pressure on the downstream side of the pressure activated device 2.012 is reduced to a point at which the pressure differential exceeds the pressure setting of the pressure activated device. The pressure differential at this operating point is determined by the mains water supply pressure at system inlet and the pressure drop through the system inlet pipe 2.002, the water heaters and hot water delivery pipe 2.003 due to flow. This arrangement enables the pressure at the delivery outlet to be maintained at a sufficient level when heavy demand (flow) occurs, trading off temperature for pressure by allowing unheated water to enter the hot water delivery pipe 2.003 when extreme demand occurs. The double headed arrow between the one way valve 2.007 and the system inlet pipe 2.002 indicates that the flow can be reversed when very high demand occurs and causes a pressure drop across the water heaters of sufficient magnitude to activate the pressure activated device 2.012.

Each water heater can be equipped with monitor means to monitor the water heater for faults. Additional control means, such as controller 2.010 can be used to respond to fault signals from the water heater monitor means. The controller 2.010 can also activate an alarm in response to a fault indication. The controller 2.010 can be combined with a second controller, for example in a programmable controller, or it can be incorporated in a centralized building monitoring system.

While the pump can be run continuously, in an alternative mode of operation, the pump may be run intermittently. During periods of low or zero use, the water in the close loop hot water supply-return circuit will cool. When the temperature sensor 2.008 detects a temperature below the predetermined first threshold, it activates the pump 2.005. The pump then circulates the water in the hot water delivery pipe 2.003, the building hot water distribution network 2.024 and hot water return pipe 2.006 through the water heaters. When the temperature sensor 2.008 detects that the temperature of the water from the pump exceeds a second threshold temperature higher than the first threshold temperature, the controller 2.010 turns the pump off. Thus the temperature of the water in the close loop hot water supply-return circuit can be maintained within a desired temperature range without the need to maintain continuous pump operation.

During periods of hot water consumption, the controller 2.010 controls the water control valves of the water heaters so water is allowed to flow through only the required number of water heaters, the number of water heaters used depending on the designed pump flow rate and the flow demand.

Figure 6:
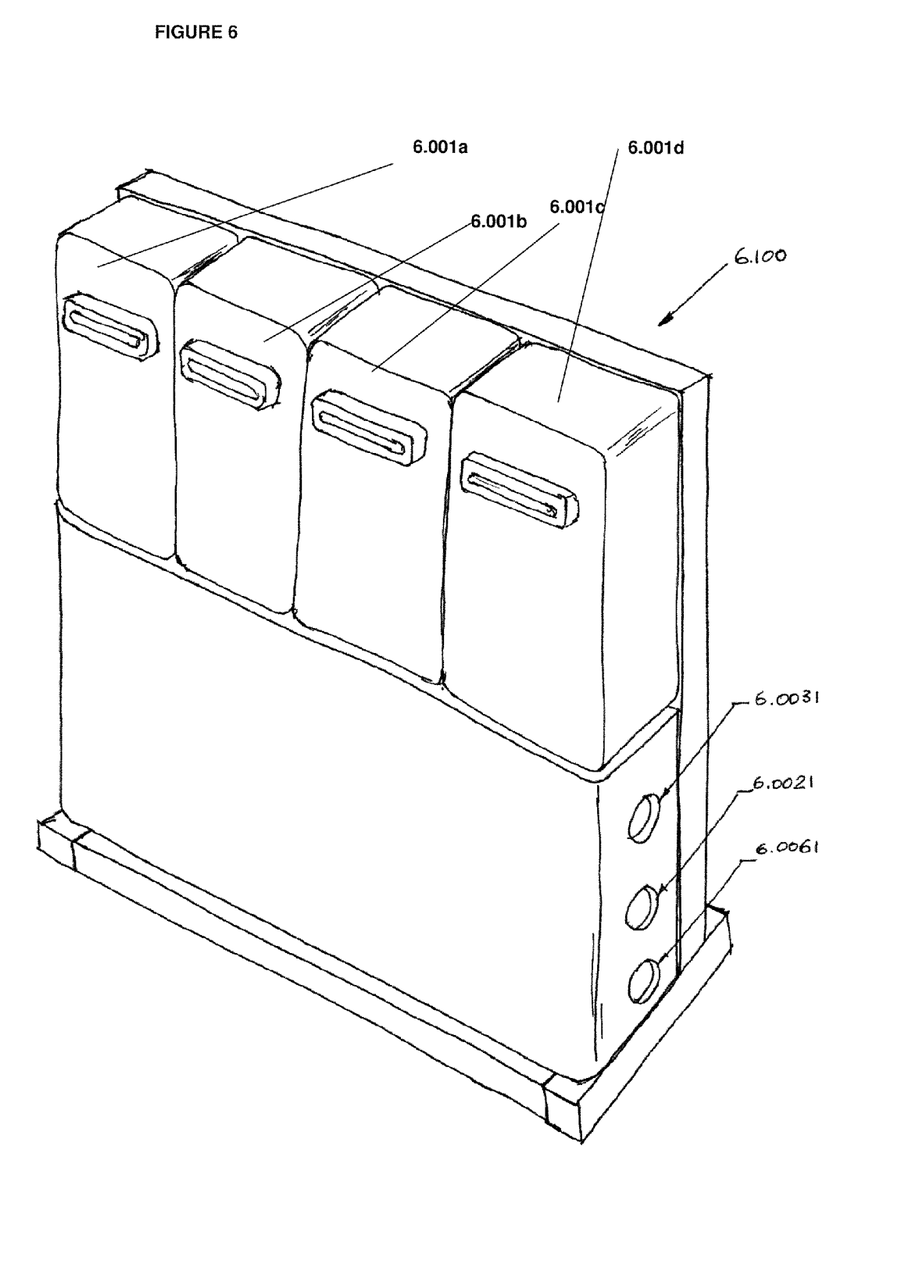
FIG. 6 illustrates a perspective view of a water heating appliance which has one of the embodiments of the invention illustrated in FIGS. 2 to 5.

The system of FIG. 2 can be purpose built or incorporated in an appliance 6.100 as illustrated in FIG. 6, where a mains water supply or pre-heated hot water inlet 6.0021, a hot water outlet 6.0031 and a HW return inlet 6.0061 are provided. The appliance 6.100 has four modular water heaters 6.001*a*, 6.001*b*, 6.001*c* and 6.001*d* and can be a stand alone floor mounted system or a wall mounted system.

Figure 3:
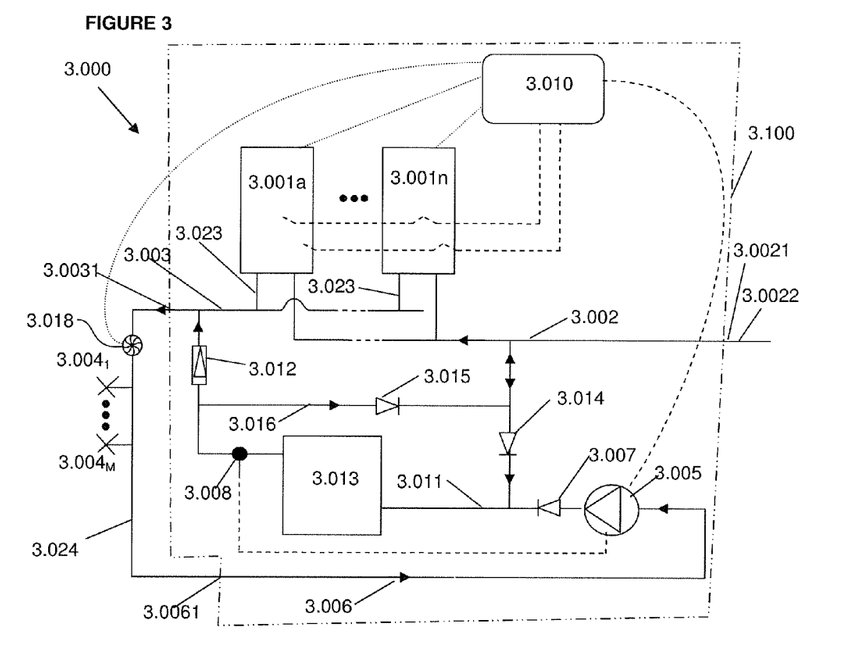
FIG. 3 is a schematic illustration of a water heating system according to a further embodiment of the invention.

FIG. 3 illustrates a system according to a further embodiment of the invention. This arrangement is adapted to compensate for the loss of temperature at the hot water delivery pipe 2.003 of FIG. 2 when the supplemental flow pipe 2.011 is used.

This embodiment adds a storage tank 3.013 in the supplemental flow pipe 3.011, and a recirculation pipe 3.016 with non-return valve 3.015, as well as a further non-return valve 3.014, to the arrangement of FIG. 2. In addition, the temperature sensor 3.008 is located to respond to the temperature of water from the storage tank 3.013.

The non-return valves 3.007, 3.014, & 3.015 are arranged to direct the flow of water to permit the water heating system to deliver heated water from the water heaters 3.001*a* . . . 3.001*n* and from the storage tank 3.013 simultaneously to the hot water delivery pipe 3.003 during heavy demand, and to permit the pump to circulate water from the hot water delivery pipe 3.003, via the building hot water distribution pipe, to the hot water return pipe 3.006, the storage tank 3.013 and through the water heaters 3.001*a* . . . 3.001*n*, so the heated water in the storage tank 3.013 can be replenished. Thus non-return valve 3.007, blocks reverse flow into the hot water return pipe 3.006 from mains water supply at system inlet while permitting the pump to circulate water through storage tank 3.013.

Non-return valve 3.014 enables water from the mains water supply at system inlet to enter the storage tank 3.013 when the pressure activated device 3.012 is open. Non-return valve 3.015 inhibits water from system inlet from short-circuiting the storage tank 3.013 and being supplied directly to the pressure activated device 3.012.

The storage tank 3.013 is well insulated. Thus it will retain its temperature above the lower temperature threshold for a longer period than the hot water delivery pipe 3.003 and the building hot water distribution pipe 3.024, which have a larger surface area to water volume ratio than the storage tank 3.013. Hence, even if the efficiency of the insulation, if any, on the hot water delivery pipe 3.003 and the building hot water distribution pipe 3.024 were to be equivalent to that of the storage tank 3.013, the temperature of the water in the storage tank would fall at a slower rate than the temperature of the water in the hot water delivery pipe 3.003 and the building hot water distribution pipe 3.024.

The pressure differential across pressure activated device 3.012 is determined by the flow of water through the water heaters in the water heating system. High demand for water in the hot water delivery pipe 3.003 increases the pressure differential across pressure activated device 3.012. When the pump 3.005 is idle, and the inlet water pressure at system inlet pipe 3.002 exceeds the water pressure in the hot water delivery pipe 3.003 by the pre-set operating pressure differential of the pressure activated device 3.012, some water flows from the mains water supply through non-return valve 3.014, storage tank 3.013 and pressure activated device 3.012, then join with hot water delivered from the water heaters. The non-return valve 3.015 in the recirculation pipe 3.016 inhibits flow from mains water supply via the recirculation pipe 3.016.

A flow detector 3.018 or flow detector in each water heater can detect the flow rate and the controller 3.010 can select the appropriate number of water heaters to heat the required flow of water.

The system has a number of operating modes.

A first operating mode is the maintenance of water temperature in the close loop hot water supply-return circuit when there is no water drawn by the users.

A second mode of operation is the supply of hot water and maintenance of the water temperature in the hot water supply-return circuit when the water is drawn at a flow less than the maximum design flow of the water heaters.

A third mode of operation is the supply of hot water and maintenance of water temperature in the hot water supply-return circuit when the flow exceeds the maximum design flow of the water heaters.

A fourth mode of operation occurs when water is drawn while the pump is off and the flow of water is less than the maximum design flow of the water heaters.

A fifth mode occurs while the pump is off and the flow exceeds the maximum design flow of the water heaters.

In the first operating mode, the water heating system maintains the temperature of the water in the close loop hot water supply-return circuit when there is no water drawn off by the user outlets or heat exchanger devices 3.004.

Pump 3.005 is connected to the inlet of storage tank 3.013. The temperature sensor 3.008, which is located on the outlet side of the storage tank 3.013, detects the temperature at the outlet of the storage tank 3.013. When the temperature sensed by the temperature sensor 3.008 detects that the temperature has fallen below a first temperature threshold, it turns the pump 3.005 on. This causes the water in the tank to be circulated around a water circuit including recirculation pipe 3.016, non-return valve 3.015, system inlet pipe 3.002, through a selected one of the water heaters 3.001a . . . 3.001n, into the hot water delivery pipe 3.003, the building hot water distribution pipe, the return pipe 3.006, the pump 3.005, non-return valve 3.007, and into the inlet of storage tank 3.013. The temperate sensor 3.008 and its associated control system, can allow users to define a minimum run time for the pump 3.005 so that it can avoid short-cycling of the pump. The water is circulated around this path until the temperature sensed by the temperature sensor 3.008 is above a second temperature threshold higher than the first temperature threshold. The pump and water heaters can then be turned off until the temperature sensor again detects a temperature below the first temperature threshold. Hence the water in the storage tank can be maintained at a temperature within a desired temperature range while there is no water being drawn off.

A person skilled in the art will understand that, in this first mode, the pressure from the pump 3.005 while the pump is operating prevents flow from non return valve 3.015 through non return valve 3.014 due to pressure drops through the storage tank 3.013 and non return valve 3.015.

In the second mode of operation when the water is drawn at a flow less than the maximum design flow of the water heaters with the pump is running, in this case, the temperature sensor 3.008 detects the water temperature is below the first threshold temperature and the controller 3.010 turns the pump on. So long as the pressure delivered by the pump 3.005 can overcome the pressure loss at the storage tank, non return valve 3.015 and friction loss of the water circuit, water flows from the building hot water distribution pipe 3.024 into hot water return pipe 3.006, via the pump 3.005, non-return valve 3.007, into the storage tank 3.013, via recirculation pipe 3.016, non-return valve 3.015, joins with the mains water supply drawn into the system as demanded by user outlets 3.004, and the water heaters. Water pumps through the water circuit will be reheated by the water heaters 3.001a . . . 3.001n until water temperature sensed by temperature sensor 3.008 reaches the second threshold temperature and turns the pump off. Thus, water temperature in water circuit and storage tank can be maintained.

In the case where the demand flow exceeds the maximum design flow for the water heaters while the pump is operating (third mode of operation), the operation changes as additional flow from the water heating system is required to meet the flow demand. When the pressure at the outlet of pump 3.005 drops below the system inlet pressure at 3.002, the non return valve 3.015 has higher pressure at its outlet than its inlet, and flow through this valve ceases. At the same time non return valve 3.014 has higher pressure at its inlet than its outlet, so water from the mains water supply can flow through non return valve 3.014, storage tank 3.013 displaying hot water out of the storage tank, via pressure activated valve 3.012 and join with the hot water delivered by the water heaters from the hot water delivery pipe 3.003. Thus water temperature delivered by the water heating system can be maintained and avoid excessive pressure loss due to high demand. (Note: there will be no blending as non return valve 3.007 is closed, no flow from the pump)

In first, second and forth modes operations, the pressure activated device 3.012 does not permit flow from the outlet of storage tank 3.013 to the hot water delivery pipe 3.003 because the pressure drop through the heater is not sufficient to operate the pressure activated device 3.012.

In the forth mode of operation water is drawn at a flow less than the maximum design flow of the water heaters. In this instance, again the pressure activated device 3.012 remains closed, as the flow is below the maximum design flow of the water heaters. The pump 3.005 can be turned off, when temperature sensor 3.008 detects that the water temperature has reached the second temperature threshold and it is above the first temperature threshold. Water flow drawn from hot water consumption outlet 3.0041 . . . 3.004M will activate one or more of the water heaters determined by controller 3.010.

However, if the demand is prolonged, the temperature of the water in the storage tank may fall below the first temperature threshold. In this case, the temperature sensor 3.008 will turn the pump on to maintain the water in the hot water supply-return circuit and the storage tank 3.013 within the required temperature range. Thus, the water in the storage tank will be delivered to the system inlet pipe 3.002 and circulated around the water circuit to raise the temperature of the water in the hot water supply-return circuit and the storage tank to the second threshold temperature. At this stage, the temperature sensor 3.008 will turn pump 3.005 off.

This also has the effect of ensuring that, if the water is being drawn off from a tap 3.0041, which is upstream of one or more other taps (3.004M), nearer to the heaters, the water in the building hot water distribution pipe is maintained at the required temperature.

In the third and fifth modes of operation, the flow of water drawn off exceeds the maximum designed flow of the water heaters. In this case, the pressure drop across pressure activated device 3.012 will be sufficient to permit flow from the storage tank outlet through the pressure activated device into the hot water delivery pipe 3.003, due to the pressure drop through the water heaters. The non-return valves 3.007 and 3.015 prevent water from mains water supply from flowing in their respective pipes. Thus water will flow from mains water supply, through non-return valve 3.014, through storage tank 3.013, and into pressure activated device 3.012 to hot water delivery pipe 3.003. Thus, the stored heated water from storage tank 3.013 will be delivered to the hot water delivery pipe 3.003. Thus this system can mitigate both the drop in pressure and the drop in temperature when the flow through the water heaters reaches the maximum designed flow.

When there is low demand on the hot water consumption outlets, the temperature sensor 3.008 and its associated control system, will detect when the temperature in the pipe connected to the outlet of the storage tank 3.013 falls below the first threshold temperature and will turn the pump on. The non-return valve 3.014 inhibits water from the pump from flowing directly to the mains water supply or system inlet pipe 3.002, and the pump thus causes water in the storage tank 3.013 to be circulated around the hot water supply-return circuit, via the non-return valve 3.015 and the water heaters 3.001a . . . 3.001n to the hot water delivery pipe 3.003.

The pump 3.005 remains off until the temperature sensor 3.008 detects that the water from storage tank 3.013 has fallen below the first temperature threshold.

The operating pressure of the pressure activated device determines the flow paths during different operating conditions. In particular, the pressure activated device permits mains water to flow through the storage tank when there is high demand, compensating for pressure losses in the water heaters with additional heated water from the storage tank 3.013. This mitigates the pressure/temperature compromise of the arrangement of FIG. 2.

When there is low demand, the pressure activated device inhibits flow from the mains water supply through the storage tank. When the temperature sensor 3.008 and its associated control system turns the pump on, the water is circulated from the hot water return pipe 3.006, through the storage tank 3.013, along pipe 3.016 via non-return valve 3.015, through a selected one of the heaters 3.001a . . . 3.001n to the hot water delivery pipe 3.003 and the building hot water distribution pipe 3.024. Thus the water in the hot water delivery pipe 3.003, the building hot water distribution pipe 3.024, the hot water return pipe 3.006, and the storage tank 3.013 can be heated by the pumped circulation.

The embodiment of FIG. 3 is incorporated within an appliance 3100 which is schematically represented by a dash then two dot broken line in FIG. 3, or in an appliance housing 6.100 such as illustrated in FIG. 6. However, if desired, the system can be purpose built.

Figure 4:
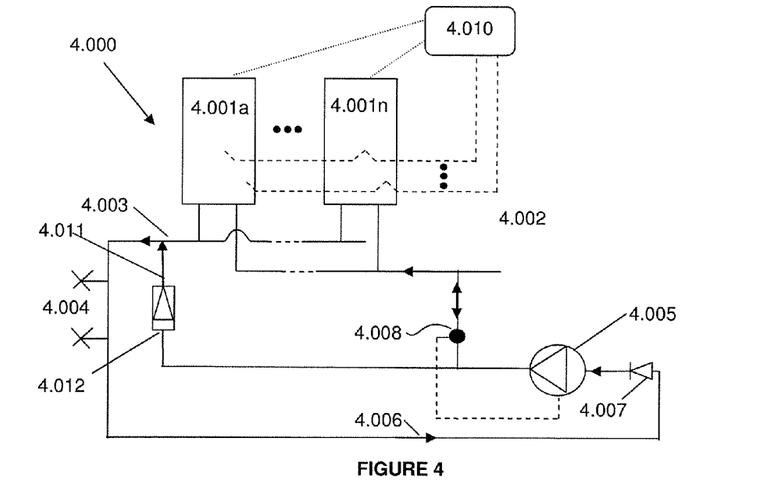
FIG. 4 shows a modification of the embodiment of FIG. 2.

If desired, as illustrated in FIG. 4, the outlet of the pump 4.005 can alternatively be connected to the hot water delivery pipe 4.003 with the non-return valve 4.007 being on the inlet side of the pump 4.005. While it may not a regular practice to install non-return valve 4.007 at the pump inlet, it will fulfil the function of stopping water flow from the mains water supply to any of the hot water consumption outlets 4.004 via the hot water return pipe 4.006.

Figure 5:
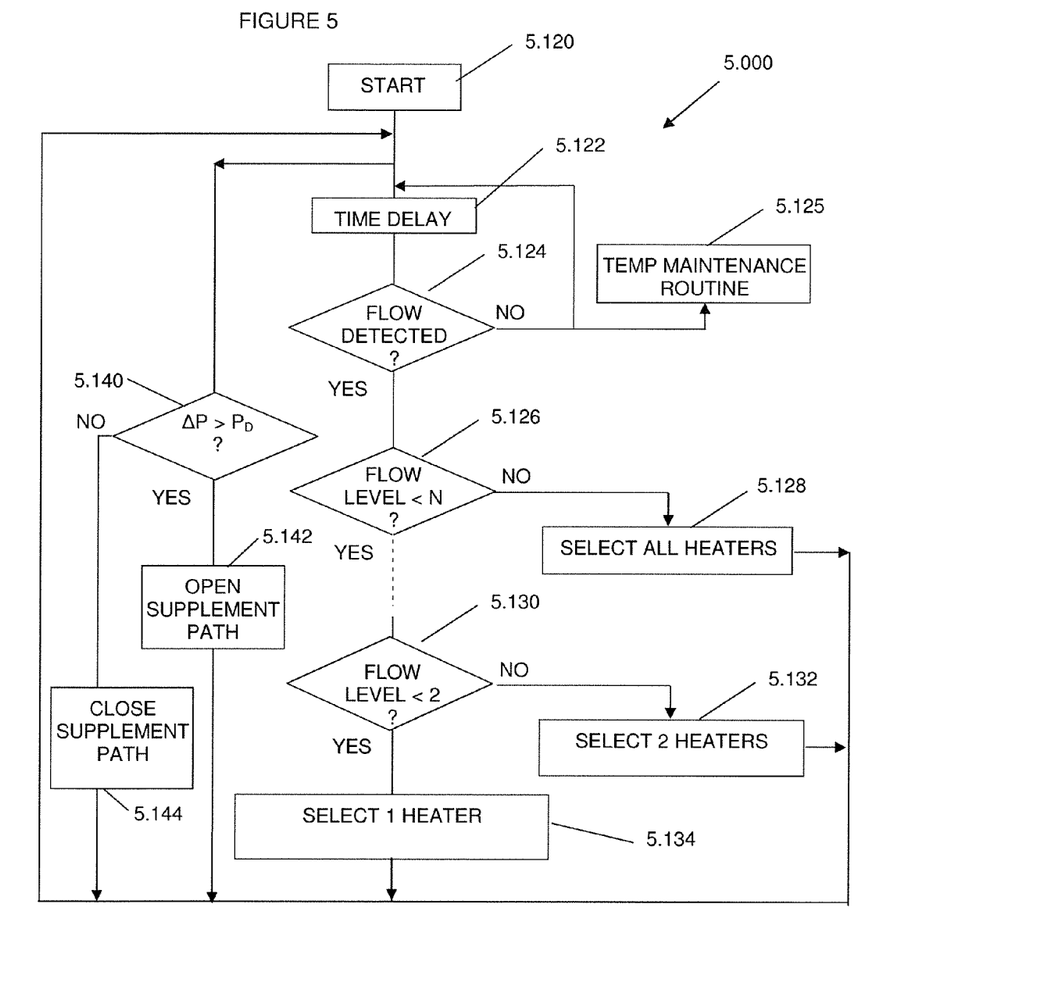
FIG. 5 is a flow diagram illustrating an operating mode of a system according to an embodiment of the invention.

FIG. 5 is a flow diagram illustrating a method of operating a circulating water heating system according to an embodiment of the invention.

The system starts operating at step 5.120. A time delay 5.122 can be provided to control the rate of repetition of the process.

A check of the flow detector output is carried out at step 5.124, if no flow is detected, the system returns to a no flow temperature maintenance routine 5.125. Using the feedback loop from the output of flow detection step 5.124, the maintenance routine 5.125 input is periodically updated (delay Si 22) from the flow detection process at 5124 indicating whether flow has commenced.

If flow is detected, the level of flow is then analysed at steps 5.126 to 5.130. At step 5.126, if the flow is requires all N water heaters of the system, then the N water heaters are turned on at step 5.128. If the flow does not require all N water heaters, a series of checks of the flow level are carried out (dashed line) to determine the number of water heaters required to accommodate the flow level. The final check is shown at 5.130 to determine if the flow requires 2 water heaters. If so, then the two water heaters selected are turned on at step 5.132.

If the flow requires less than 2 water heaters, a single water heater is selected at 5.134.

A temperature sensor can also be incorporated in the water heater control when the water temperature at the system outlet exceeds a predetermined threshold, eg, 70° C., water heaters can be turned off one at a time until the temperature is within a predetermined range.

Concurrently, the pressure activated device monitors the pressure differential $\Delta P$ at step 5.140, and when $\Delta P$ exceeds PD, at step 5.142 the pressure activated device opens the supplemental path from the water supply or system inlet pipe to the hot water delivery pipe. When $\Delta P$ falls below PD, the supplemental path is closed at step 5.144.

Of course, the process can be implemented in other ways. For example, the flow detector output can be compared with a look-up table to determine which water heaters need to be activated.

The term "non-return valve" is equivalent to "one-way-valve".

In this specification, reference to a document, disclosure, or other publication or use is not an admission that the document, disclosure, publication or use forms part of the common general knowledge of the skilled worker in the field of this invention at the priority date of this specification, unless otherwise stated.

In this specification, terms indicating orientation or direction, such as "up", "down", "vertical", "horizontal", "left", "right" "upright", "transverse" etc. are not intended to be absolute terms unless the context requires or indicates otherwise.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A water heating system connected to a building hot water distribution network, said water heating system comprising:
 a system water inlet;
 a water delivery outlet connected to the building hot water distribution network;
 a hot water return inlet connected to the building hot water distribution network;
 one or more water heaters, each water heater having a heater inlet that is connected to the system water inlet to receive water from a water supply and to the hot water return inlet to receive water from the building hot water distribution network and a heater outlet that is connected to the delivery outlet to deliver water from the water heater to the building hot water distribution network;

an unheated supplemental water flow path connecting the system water inlet to the delivery outlet, the supplemental water flow path bridging the one or more water heaters and including a flow control device adapted to permit flow from the system water inlet to the delivery outlet when a pressure differential across the one or more water heaters exceeds a predetermined pressure differential; and a storage tank in the supplemental water flow path, whereby water from the storage tank is delivered to the water delivery outlet when the pressure differential across the flow control device opens the flow control device.

2. A system as claimed in claim 1, including a first non-return valve in the supplemental water flow path on an inlet side of the storage tank from the system water inlet.

3. A system as claimed in claim 2, including a second non-return valve connecting an outlet of the storage tank to the system water inlet.

4. A system as claimed in claim 1, wherein the supplemental water flow path connects the system water inlet and the hot water return inlet to the delivery outlet and wherein the storage tank is downstream from the system water inlet and the hot water return inlet in the supplemental water flow path.

5. A water heating system connected to a building hot water distribution network, said water heating system comprising:

a system water inlet;

a water delivery outlet connected to the building hot water distribution network;

a hot water return inlet connected to the building hot water distribution network;

the water heating system including one or more water heaters, each water heater having a heater inlet that is connected to the system water inlet to receive water from a water supply and to the hot water return inlet to receive water from the building hot water distribution network and a heater outlet that is connected to the delivery outlet to deliver water from the water heater to the building hot water distribution network; and a supplemental water flow path connecting the system water inlet to the delivery outlet, the supplemental water flow path bridging the one or more water heaters and including a flow control device adapted to permit flow from the system water inlet to the delivery outlet when a pressure differential across the one or more water heaters exceeds a predetermined pressure differential, wherein the supplemental water flow path is connected to the hot water return inlet to receive water from the building hot water distribution network at a point in the supplemental water flow path between the system water inlet and the delivery outlet; and a storage tank in the supplemental water flow path, whereby water from the storage tank is delivered to the water delivery outlet when the pressure differential across the flow control device opens the flow control device.

6. A system as claimed in claim 5, wherein the storage tank is downstream from the system water inlet and the hot water return inlet in the supplemental water flow path.

* * * * *